United States Patent [19]
Okamura et al.

[11] 4,422,599
[45] Dec. 27, 1983

[54] MAGNETIC TAPE CASSETTE

[75] Inventors: Masatoshi Okamura; Haruo Shiba, both of Tokyo, Japan

[73] Assignee: TDK Electronics Co., Ltd., Tokyo, Japan

[21] Appl. No.: 323,080

[22] Filed: Nov. 19, 1981

[30] Foreign Application Priority Data

Feb. 9, 1981 [JP] Japan .............................. 56-16864[U]

[51] Int. Cl.³ ...................... G03B 1/04; G11B 15/32; G11B 23/04
[52] U.S. Cl. .................................................. 242/198
[58] Field of Search .............................. 242/197–200, 242/192; 360/93, 96.1, 132, 137

[56] References Cited
U.S. PATENT DOCUMENTS
4,235,395 11/1980 Wardenaar et al. ................ 242/199

Primary Examiner—Leonard D. Christian
Attorney, Agent, or Firm—Oblon, Fisher, Spivak, McClelland & Maier

[57] ABSTRACT

A magnetic tape cassette has a guard panel pivotally supported in the front of the upper half casing to be opened and closed in which a guide groove is formed near a hole for receiving a pin of the guard panel to guide the pin into the hole.

3 Claims, 6 Drawing Figures

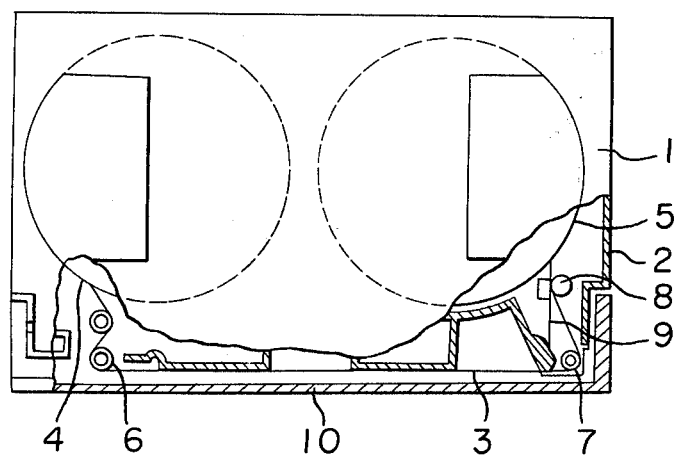
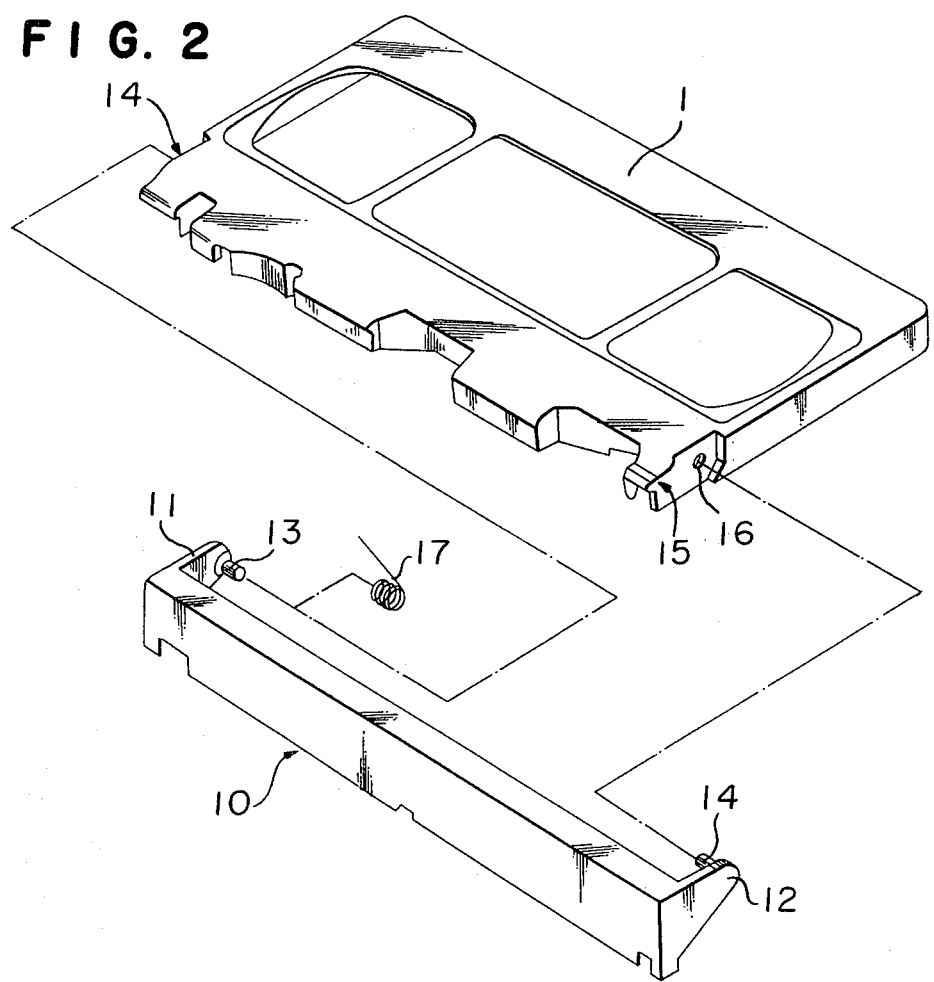

MAGNETIC TAPE CASSETTE

BACKGROUND OF THE INVENTION

1. Field of the Invention

The present invention relates to a magnetic tape cassette for the VHS system used in a VHS type video tape recorder.

2. Description of the Prior Art

FIG. 1 illustrates the conventional magnetic tape cassette wherein reels (4), (5) for winding a magnetic tape (3) are held inside the casing assembly formed by an upper half casing (1) and a lower half casing (2) and tape guides (6), (7) and (8) for guiding the magnetic tape (3) and a tape pad (9) are provided in the running passage of the magnetic tape between the reels (4), (5) in front of the casing assembly so that the magnetic tape (3) runs between the reels (4), (5) while it is successively brought into contact with these parts (6) to (9). The front portion of the casing assembly is a running area for the magnetic tape and is covered by a guard panel (10) which is pivotally supported by the upper half casing so as to be capable of opening and closing.

The guard panel (10) is used to protect the magnetic tape (3) and is normally closed by a locking means (not shown) to cover the magnetic tape (3) running in front of the casing assembly. The guard panel is, however, turned toward the upper half casing (1) by the releasing of the locking means when the casing assembly is mounted on a video deck so that the running area for the magnetic tape (3) in front of the casing assembly is exposed. Thus, the guard panel is pivotally supported to be capable of opening and closing.

FIG. 2 is a schematic view of the upper half casing (1) and the guard panel (10) in the disassembled state. A pair of projecting support arms (11), (12) are formed at both ends of the guard panel (10) and fitting pins (13), (14) projecting toward the inside of the guard panel are respectively formed on each support arm (11) or (12) at the corresponding position. On the other hand, a pair of holes (16), (16) are respectively formed in each flat stepped portion (15) provided in each front side surface of the upper half casing (1).

The fitting of the guard panel (10) into the upper half casing (1) is carried out by loosely fitting the pin (14) into the hole (16) formed in the flat portion (15) of the upper half casing (1) after a coil spring (17) is mounted on the pin (13). However, since the hole is formed in the flat portion (15), the pin (14) is apt to move freely on the flat portion (15). Thus, it is difficult to guide quickly and smoothly the pin (14) into the hole (16). It takes much time to fit the guard panel (10) to the upper half casing (1).

SUMMARY OF THE INVENTION

It is an object of the present invention to overcome the disadvantage of the conventional tape cassette and to provide a tape cassette permitting quick and smooth fitting of a guard panel to an upper half casing.

The foregoing and the other objects of the present invention have been attained by providing a tape cassette having a guard panel pivotally supported in front of an upper half casing wherein the upper half casing is provided with a guide groove for guiding a pin formed on the guard panel to a hole formed in the upper half casing.

BRIEF DESCRIPTION OF DRAWINGS

FIG. 1 is a front view, partly sectioned of a typical tape cassette;

FIG. 2 is a schematic view in a disassembled state of the upper half casing and the guard panel of the conventional tape cassette;

FIG. 4 (B) is a sectional view taken along the line $B_1$—$B_1$ of FIG. 4 (A)

DETAILED DESCRIPTION OF PREFERRED EMBODIMENT

An embodiment of the present invention will be described with reference to the drawings.

Figure 3:
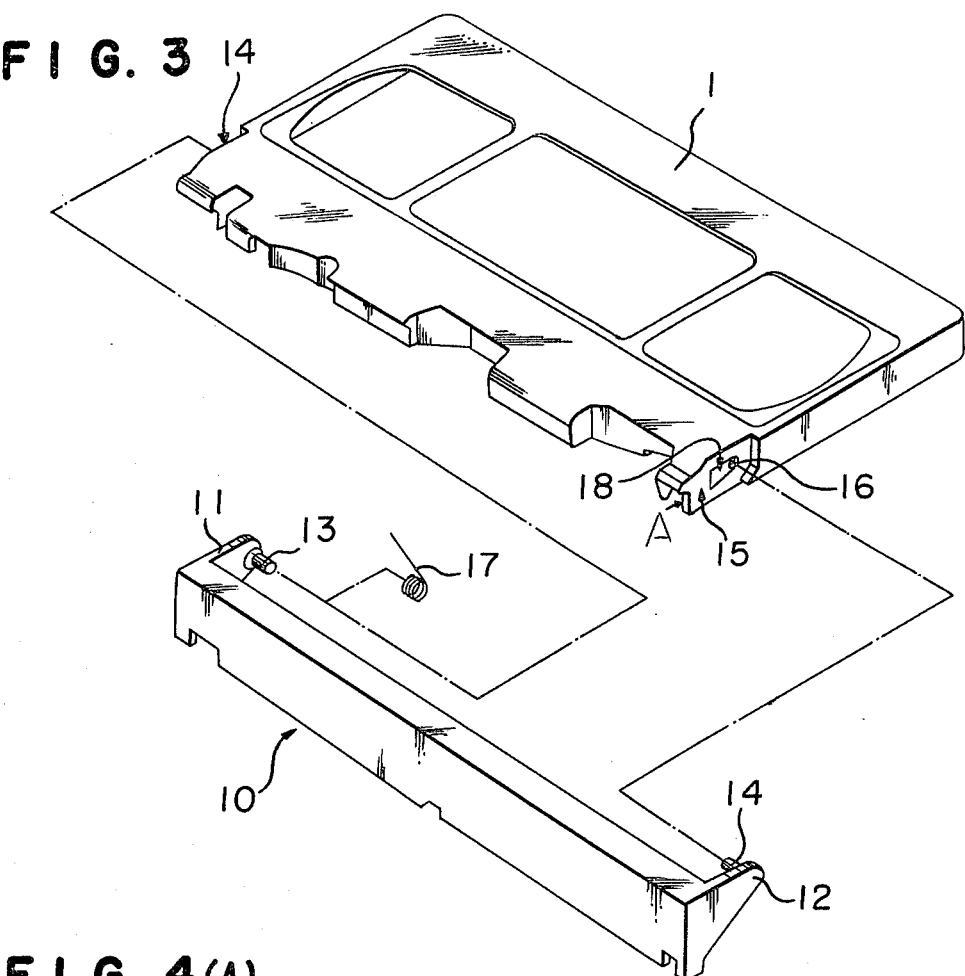
FIG. 3 is a schematic view in the disassembled state of the upper half casing and the guard panel of the present invention.
Figure 4A:
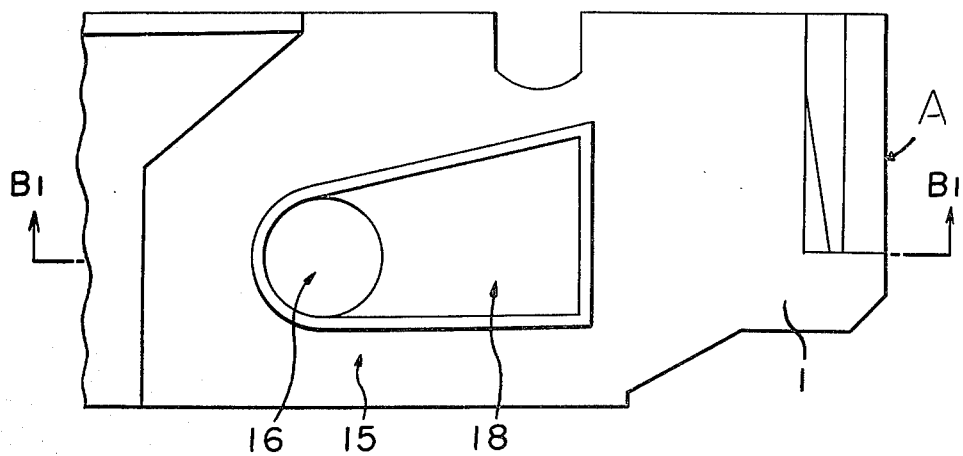
FIG. 4 (A) is an enlarged side view of an important part of the upper half casing.
Figure 4B:
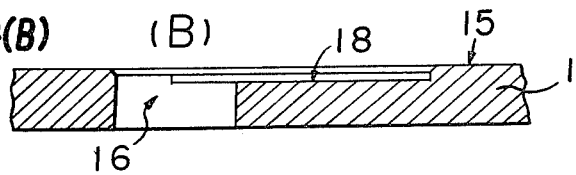
Figure 5:
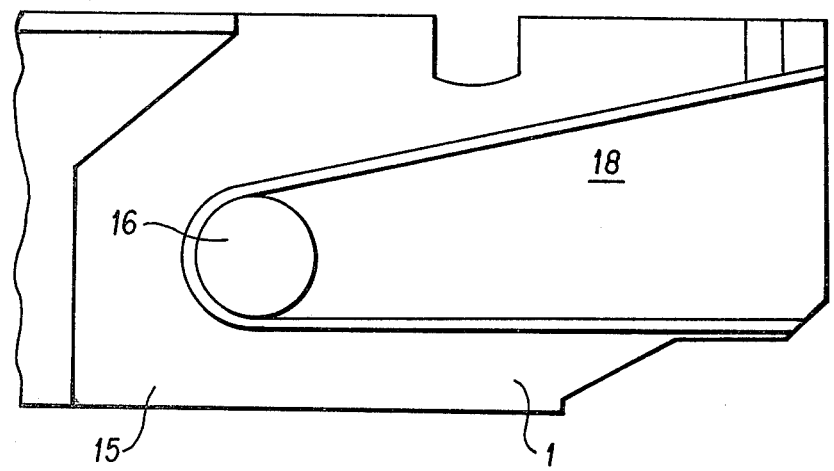
FIG. 5 is a view identical to that of FIG. 4 (A), but showing a second embodiment.

FIG. 3 is a schematic view in a disassembled state of an upper half casing (1) and a guard panel (10) of the tape cassette of the present invention wherein the same reference numerals as in FIGS. 1 and 2 designate parts having the same function. In FIG. 3, a guide groove (18) is formed in a flat portion (15) of the upper half casing (1) where a hole (16) is formed. The guide groove is to guide a pin (14) of the guard panel (10) when the guard panel is assembled to the upper half casing. As is clearly shown in FIGS. 4 (A) and 4 (B), the guide groove (18) has a chamfered peripheral portion and is extended while widened toward the front end (A) of the upper half casing (1). The periphery of the guide groove can be a stepped portion. Also, the guide groove (18) can be extended to the front end (A) of the upper half casing (1) or can be slanted to the hole (16).

The guide groove (18) assures the guiding of the pin (14) of the guard panel (10) into the guide groove (18) to fit the pin in the hole (16) when the guard panel is mounted on the upper half casing (1). The guide groove, therefore, allows a guick, smooth assembling operation of the guard panel (10) to the upper half casing (1) without any risk of misassembling operation thereby greatly improving the assembling operation.

As described above, the tape cassette of the present invention has a guard panel pivotally supported in front of the half casing to be opened and closed in which a guide groove is formed near the hole for receiving a pin of the guard panel to guide the pin into the hole whereby the guard panel can be quickly and smoothly fitted to the upper half casing without any misassembling operation. The provision of the guide groove permits an improved assembling operation and application of automatic assembling operation for tape cassettes.

We claim:

1. A magnetic tape cassette comprising:
   an upper half casing having first and second sides and a front defining a tape travel path;
   a hole in each of said sides;
   a guard panel having two ends, each of said ends including a pin;
   a guide groove in each of said sides, each said guide groove defining an area including one of said holes and extending toward said front, the width of each said groove increasing toward said front, wherein each said guide groove includes a chamfered edge, whereby each of said pins is guided into one of said holes so that said guard panel is pivotally supported on said half casing.

2. A magnetic tape cassette according to claim 1 wherein each said guide groove is formed in a flat surface on one of said sides so as to guide said pin to said hole.

3. A magnetic tape cassette according to claim 1 wherein each said guide groove extends from said hole to said front of said upper half casing.

* * * * *